United States Patent
Bouloy et al.

(10) Patent No.: US 6,698,720 B2
(45) Date of Patent: Mar. 2, 2004

(54) VALVE MEMBER WITH A CRIMPED GASKET, AND A METHOD OF MANUFACTURING SUCH A MEMBER

(75) Inventors: Alain Bouloy, Etrechy (FR); Lionel Mabboux, Sainte Genevieve des Bois (FR); Jean Chamot, Arpajon (FR)

(73) Assignee: Vernet S.A., Arpajon Cedex (FR)

( * ) Notice: Subject to any disclaimer, the term of this patent is extended or adjusted under 35 U.S.C. 154(b) by 158 days.

(21) Appl. No.: 10/033,045

(22) Filed: Dec. 27, 2001

(65) Prior Publication Data

US 2002/0084598 A1 Jul. 4, 2002

(30) Foreign Application Priority Data

Dec. 29, 2000 (FR) .............................................. 00 17313

(51) Int. Cl.$^7$ ................................................ F16K 1/46
(52) U.S. Cl. ...................................... 251/357; 251/332
(58) Field of Search ................................ 251/356, 357, 251/337, 332

(56) References Cited

U.S. PATENT DOCUMENTS

| 1,909,480 A | * | 5/1933 | Wilson ..................... 251/357 X |
| 2,519,541 A | * | 8/1950 | Bryant ........................ 251/332 |
| 2,717,757 A | * | 9/1955 | Bowlzer ................. 251/357 X |
| 3,511,475 A | * | 5/1970 | Pfau ......................... 251/357 X |
| 3,831,900 A |   | 8/1974 | Matousek et al. ........... 251/122 |
| 4,257,553 A | * | 3/1981 | Sliger et al. ............. 251/333 X |
| 4,313,594 A | * | 2/1982 | Antoniw et al. ............. 251/357 |
| 5,603,485 A |   | 2/1997 | Schwarz ..................... 251/332 |

FOREIGN PATENT DOCUMENTS

| DE | 9100356 | 5/1992 | .......... F16K/31/64 |
| EP | 0908809 | 4/1999 | .......... G05D/23/02 |
| JP | 55155978 | 12/1980 | .......... F16K/17/38 |

* cited by examiner

Primary Examiner—Gene Mancene
Assistant Examiner—Eric Keasel
(74) Attorney, Agent, or Firm—Darby & Darby

(57) ABSTRACT

In a valve member adapted to co-operate with an annular seat and comprising a plate with an annular channel for receiving a gasket which is crimped by folding in an outer wall of the channel, any risk of the gasket being ruptured is minimized by the outer surface of the gasket presenting, in the absence of any stress being exerted thereon, a first region extending frustoconically towards the central axis of the valve member, which first region is extended by a second region extending frustoconically away from the central axis, and by the outer wall of the channel being folded progressively towards the first region so as to fit snugly against the shape thereof without penetrating into the material of the gasket, without exerting any stress thereon, and without compressing it. The valve member is suitable for use in particular in thermostat valves.

6 Claims, 1 Drawing Sheet

VALVE MEMBER WITH A CRIMPED GASKET, AND A METHOD OF MANUFACTURING SUCH A MEMBER

The invention relates to a valve member for co-operating with an annular seat, the valve member comprising an annular plate presenting shaped portions defining an annular channel, and an annular gasket received in part in the channel and adapted to come into leaktight contact against the seat when the valve member is in the closed position. The invention also relates to a method of manufacturing such a member.

BACKGROUND OF THE INVENTION

Valves of this type are known, in particular from Document JP A 61 59070, in which the plate has a thin wall of smaller height than the gasket bordering the outside of the annular channel, and the region of said thin wall close to its free end surface is bent towards the inside of the annular channel in such a manner that the inside edge between said region and the end surface compresses and/or penetrates into the gasket material, thereby clamping the gasket between said edge and the walls of the channel in the plate in such a manner as to cause the gasket to be crimped within the channel.

That technique suffers from the drawback of weakening the gasket along its circumference where it is compressed by the edge between the free end surface of the thin wall of the plate and the region close to said end surface, since even if this edge does not initially penetrate into the gasket material, repeated impacts of the gasket against its seat and aging of the gasket material will lead to such penetration taking place, thereby starting a tear along said circumference which can lead to the gasket being destroyed.

OBJECTS AND SUMMARY OF THE INVENTION

An object of the invention is to remedy that drawback in a valve member that is to co-operate with an annular seat, the valve member comprising an annular plate presenting shaped portions defining an annular channel, and an annular gasket partially received in said channel and adapted to come into leaktight contact against the seat when the valve is in the closed position, the valve member and the gasket being crimped together by an edge of a wall of the plate bordering the annular channel in which the gasket is partially received compressing and/or penetrating into the material of the gasket.

For this purpose, the invention provides a valve member adapted to co-operate with an annular seat, the valve member comprising an annular plate constituted by sheet metal having bent portions defining an annular channel, and an annular gasket received in part in the channel, said sheet metal extending about a central axis from a first end surface in the form of an inner wall forming a neck suitable for engaging on a moving valve element to another end surface at which an outer wall terminates, said outer wall bordering the annular channel and converging going towards said other end surface so as to slope towards the central axis, wherein the gasket is a gasket molded out of synthetic material presenting an outer surface which, in the absence of any stress acting thereon, comprises a region extending away from the bottom web of the channel towards the central axis in sloping manner and itself extended by a region extending away from the central axis in sloping manner, and wherein the outer wall of the plate fits snugly around at least a portion of said region extending towards the central axis of the sealing gasket without penetrating into the material of the gasket and without exerting any stress or compression thereon.

By means of this structure, the cost of manufacturing the valve member remains very low and the reliability of the gasket is significantly increased.

The valve member may also present one or more of the following characteristics:

- the gasket has a base surface connected to the outer surface via a rounded zone, and the plate comprises cylindrical or approximately cylindrical segments and connecting annuluses comprising, from the first end surface: a segment constituting the inner wall of the plate; a segment extending in the opposite direction to the inner wall of the plate to constitute the inner wall of the channel; and a annulus extending outwards from the segment constituting the inner wall of the channel to constitute the bottom web of the channel, the outer wall of the channel being connected to the annulus via a fillet fitting snugly around the shape of said rounded zone of the gasket;

- the plate comprises, starting from the first end surface: a first approximately cylindrical segment constituting the inner wall of the plate, forming a neck; and a first circular shoulder annulus extending outwards from the first segment in a plane perpendicular to the central axis to connect it to a second cylindrical segment extending in the same direction as the first segment, the connections between the segments and the annulus being provided via fillets;

- practically the entire surface area of said other end surface of the plate fits snugly to the shape of a portion of a region of the outer surface of the gasket, which region slopes away from the central axis, and said end surface exerts no stress on said outer surface;

- the gasket has a region extending towards the central axis in sloping manner and connected to a free end surface of the gasket remote from its base surface in contact with a annulus of the plate, said region extending frustoconically in the absence of any stress being exerted on the outer surface of the gasket; and

- the region extending away from the bottom web of the channel towards the central axis in sloping manner comprises at least one frustoconical portion whose angle at the apex of the truncated cone, in the absence of any stress being exerted thereon, is equal to about 60°.

The invention also provides a method of manufacturing a valve member, wherein a sheet metal plate having an annular channel bordered by an approximately cylindrical outer wall has placed therein a gasket molded out of synthetic material and presenting an outer surface which, in the absence of any stress being exerted thereon, includes a region extending away from the bottom web of the channel towards the central axis in sloping manner, which region is extended by a region extending away from the central axis in sloping manner, the outer wall being crimped onto the region extending towards the central axis in sloping manner by being folded progressively inwards, and the folding of the outer wall is stopped when it fits snugly to the shape of the region extending towards the central axis in sloping manner, prior to exerting any stress on said region.

By means of this method, it is possible to obtain great precision while deforming the outer wall of the annular channel, and thus to avoid this outer wall compressing the gasket.

The method can also present the following characteristic:

to fold the outer wall towards the region extending towards the central axis in sloping manner, the outer wall is crimped onto said region by turning.

BRIEF DESCRIPTION OF THE DRAWING

Other characteristics and advantages of the invention appear from the following description of an embodiment and an implementation of the invention given as non-limiting examples, and shown in the accompanying drawing, in which.

MORE DETAILED DESCRIPTION

Figure 1:
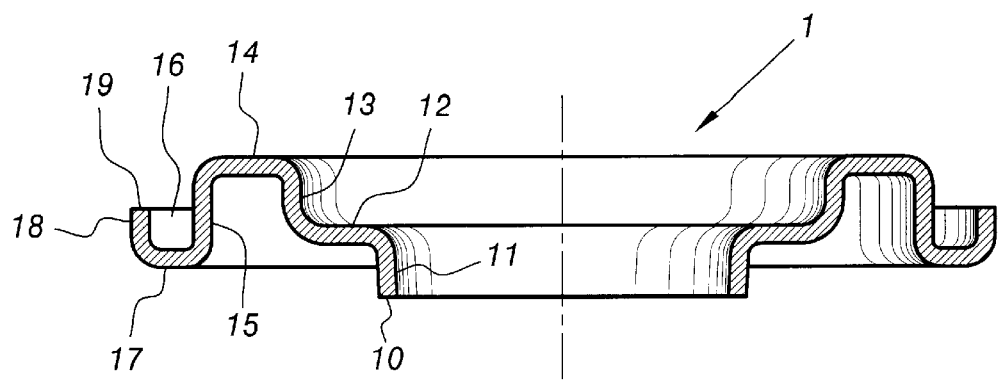
FIG. 1 is a cross-section through a plate used in making a valve member of the invention, prior to inserting a sealing gasket.
Figure 2:
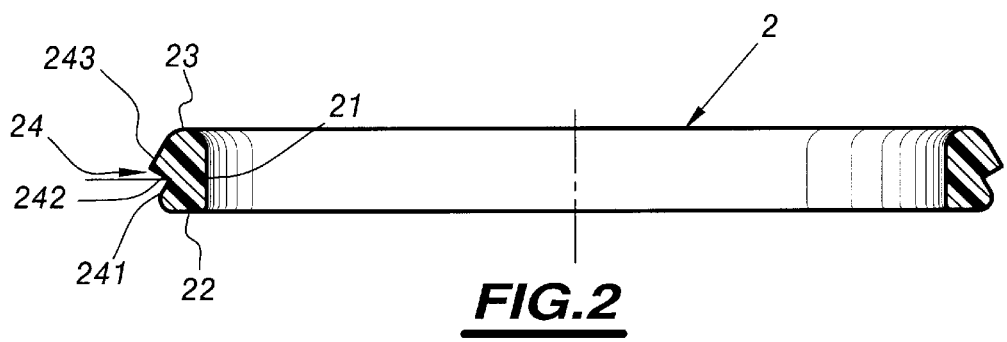
FIG. 2 is a cross-section through a sealing gasket used in making the valve member of the invention.
Figure 3:
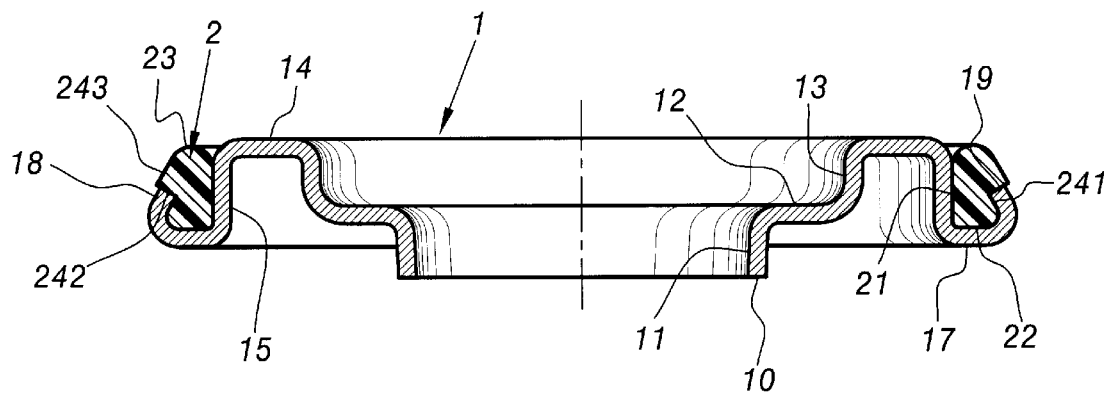
FIG. 3 is a cross-section through a valve member of the invention.

The valve member of the invention is adapted to co-operate with an annular seat and comprises a metal plate 1 which is itself annular in shape, being made of tubular sheet metal shaped by any suitable conventional bending method so as to achieve the initial configuration as shown in FIG. 1.

The plate 1 is made up of segments that are cylindrical or approximately cylindrical having circular right section and extending coaxially about a central axis, which segments are interconnected by annuluses lying in planes that are perpendicular to said central axis. The connections between the cylindrical segments and the annuluses are not sharp-edged, but are provided by rounded fillets having a radius of a few tenths of a millimeter.

Starting from a first end surface 10 of the plate, an approximately cylindrical segment 11 of smallest diameter constitutes the inner wall of the plate and forms a neck suitable for being engaged on a body of generally cylindrical shape and constituting a moving element of a valve, e.g. the moving element of a wax-based thermostat.

In general, such a moving valve element has a collar for securing the valve member, and thus the plate has a first circular shoulder annulus 12 extending outwards from the first approximately cylindrical segment to reach a second cylindrical segment 13 of larger diameter and adapted to engage around the collar of the moving element of the valve and extending, relative to the end face 10, in the same direction as the first approximately cylindrical segment 11.

The second cylindrical segment 13 is connected by means of a second circular shoulder annulus 14 extending outwards therefrom to a third cylindrical segment 15 that is bent so as to extend in the opposite direction to the first and second segments and constitute an inside wall of an annular channel 16 adapted to house part of a sealing gasket 2 which is described below.

A third annulus 17 extends outwards from the third cylindrical segment 15 and constitutes the bottom web of the annular channel 16, connecting the third segment to a fourth cylindrical segment 18 extending in the same direction as the first and second segments, i.e. in the opposite direction to the third segment 15, thereby constituting the outer wall of the channel 16.

The third annulus 17 lies in a plane perpendicular to the central axis that is situated between the plane of the first end surface 10 and the plane of the first annulus 12.

The fourth cylindrical segment 18 terminates in the second end surface 19 of the plate, which lies in a plane perpendicular to the central axis situated between the plane of the first annulus 12 and the plane of the second annulus 14.

The sealing gasket 2 is an annular piece of molded synthetic material comprising, around a central axis: a cylindrical inner surface 21 adapted to come into contact against the third cylindrical segment 15 constituting the inner wall of the channel 16; a base surface 22 extending around the inner surface 21 as a annulus perpendicular to the central axis and adapted to come into contact against the third annulus 17 of the plate constituting the bottom web of the channel 16; a free end surface 23 extending as a curved surface away from the inner surface 21; and an outer surface 24 presenting a stepped profile as described below.

The curved free end surface 23 is connected to the inner surface 21 and to the outer surface 24 tangentially, while the plane base surface 22 is connected to the inner surface and to the outer surface via rounded zones presenting respective radii of a few tenths of a millimeter so that the connecting fillets of the plate 1 fit closely against the shape of the gasket 2 without compression.

In the absence of any stress being exerted on the outside surface 24, its shape going away from the base surface 22 is adapted to come into contact against the bottom web of the channel 16, and starting from its rounded connection zone therewith it comprises a region 241 sloping back towards the central axis, a second region 242 sloping away from the central axis, and a third region 243 sloping back towards the central axis. The first region 241 is frustoconical, connecting tangentially with the connection radius to the base surface 22, while the second region 242 which is also frustoconical connects to the first region 241 via a sharp right angle that is open towards the outside of the gasket 2, and the third region 243 which is also frustoconical connects to the second region 242 via a sharp right angle that is open towards the inside of the gasket material. As explained above, the third region 243 connects to the free surface 23 tangentially in this case and the angle at the apex of the truncated cone formed by this frustoconical third region 243 is equal to the angle at the apex of the frustoconical seat with which the gasket is to co-operate, and in this case the angle at the apex of the truncated cone formed by the first region 241 or by the first region 241 relative to the base surface 22 is an angle of 60°.

To make the valve member from the plate 1 and the gasket 2 as described above, the gasket 2 is placed in the channel 16 of the plate, and then the fourth cylindrical segment 18 of the plate constituting the outside wall of the channel 16 is folded inwards so as to converge going towards the second end surface 19 and become inclined towards the central axis so as to fit snugly against the material of the gasket 2 without penetrating therein and without exerting stress thereon, i.e. without compressing it. The shape of the first region 241 of the outside surface 24 of the gasket extends towards the central axis in sloping manner and the fillet connecting the fourth segment 18 then converges towards the central axis from the annulus 17 constituting the bottom web of the channel so as to fit snugly around the rounded zone of the gasket connecting its outer surface 24 to its base surface 22. The respective dimensions of the fourth segment 18 of the plate and of the first region 241 of the outer surface of the gasket are selected in such a manner that when the fourth segment 18 of the plate fits closely against the shape of the first region 241 of the outer surface 24 of the gasket, then approximately the entire area of the second end surface 19 of the plate fits closely against the shape of a fraction of the second region 242 of the outer surface 34 of the gasket, going away from the central axis in sloping manner and likewise without penetrating into the gasket material, so as to fit snugly but without compression. In this case, the height of the gasket 2 is approximately equal to or slightly less than the height of the third segment 15 measured inside the channel 18 so that the gasket is approximately level with or slightly set back from the second annulus 14 of the plate 1.

Crimping the gasket 2 in the channel 16 of the plate 1 by folding the fourth segment 18 of the plate inwards so that it converges towards the central axis is implemented by means of an operation known in the art as "gyroscopic crimping" or "turning", and is not performed by striking the fourth segment. Because the crimping is performed by turning, the plate is moved against the gasket very progressively, e.g. with the plate advancing by about one-hundredth of a millimeter per revolution. It is thus possible for the fourth segment 18 of the plate to be positioned very accurately in terms of setback relative to the sealing surface of the gasket as constituted by the third region 243 of the outer surface 24 of the gasket 2, and can thus provide security in the event of the gasket being worn abnormally (emergency sealing).

Because the outer wall 18 of the channel 16 merely fits against the shape of the gasket 2 without deforming or compressing or crimping it, the reliability of the gasket is significantly increased.

What is claimed is:

1. A valve member adapted to co-operate with an annular seat, the valve member comprising an annular plate constituted by sheet metal having bent portions defining an annular channel, and an annular gasket received in part in the channel, said sheet metal extending about a central axis from a first end surface in the form of an inner wall forming a neck suitable for engaging on a moving valve element to another end surface at which an outer wall terminates, said outer wall bordering the annular channel and converging going towards said other end surface so as to slope towards the central axis, wherein the gasket is a gasket molded out of synthetic material presenting an outer surface which, in the absence of any stress acting thereon, comprises a region extending away from the bottom web of the channel towards the central axis in sloping manner and itself extended by a region extending away from the central axis in sloping manner, and wherein the outer wall of the plate fits snugly around at least a portion of said region extending towards the central axis of the sealing gasket without penetrating into the material of the gasket and without exerting any stress or compression thereon.

2. A valve member according to claim 1, wherein the gasket has a base surface connected to the outer surface via a rounded zone, and the plate comprises cylindrical or approximately cylindrical segments and connecting annuluses comprising, from the first end surface: a segment constituting the inner wall of the plate; a segment extending in the opposite direction to the inner wall of the plate to constitute the inner wall of the channel; and a annulus extending outwards from the segment constituting the inner wall of the channel to constitute the bottom web of the channel, the outer wall of the channel being connected to the annulus via a fillet fitting snugly around the shape of said rounded zone of the gasket.

3. A valve member according to claim 1, wherein the plate comprises, starting from the first end surface: a first approximately cylindrical segment constituting the inner wall of the plate, forming a neck; and a first circular shoulder annulus extending outwards from the first segment in a plane perpendicular to the central axis to connect it to a second cylindrical segment extending in the same direction as the first segment, the connections between the segments and the annulus being provided via fillets.

4. A valve member according to claim 1, wherein practically the entire surface area of said other end surface of the plate fits snugly to the shape of a portion of a region of the outer surface of the gasket, which region slopes away from the central axis, and said end surface exerts no stress on said outer surface.

5. A valve member according to claim 1, wherein the gasket has a region extending towards the central axis in sloping manner and connected to a free end surface of the gasket remote from its base surface in contact with an annulus of the plate, said region extending frustoconically in the absence of any stress being exerted on the outer surface of the gasket.

6. A valve member according to claim 1, wherein the region extending away from the bottom web of the channel towards the central axis in sloping manner comprises at least one frustoconical portion whose angle at the apex of the truncated cone, in the absence of any stress being exerted thereon, is equal to about 60°.

* * * * *